(12) United States Patent
Galinsky (10) Patent No.: US 7,827,866 B2
(45) Date of Patent: Nov. 9, 2010

(54) PRESSURE TRANSDUCER AND METHOD FOR MONITORING THE STATE OF A PRESSURE TRANSDUCER AND PRESSURE SENSOR

(75) Inventor: Udo Galinsky, Porta Westfalica (DE)

(73) Assignee: KG transmitter components GmbH, Bad Oeynhausen (DE)

( * ) Notice: Subject to any disclaimer, the term of this patent is extended or adjusted under 35 U.S.C. 154(b) by 85 days.

(21) Appl. No.: 12/262,950

(22) Filed: Oct. 31, 2008

(65) Prior Publication Data

US 2009/0107246 A1    Apr. 30, 2009

(30) Foreign Application Priority Data

Oct. 31, 2007    (DE) ..................... 10 2007 052 395

(51) Int. Cl.
    *G01L 13/02*    (2006.01)
(52) U.S. Cl. .......................................... 73/716; 73/736
(58) Field of Classification Search ................... None
    See application file for complete search history.

(56) References Cited

U.S. PATENT DOCUMENTS

| 4,787,249 | A | * | 11/1988 | Duppui et al. ................ 73/708 |
| 5,287,746 | A | | 2/1994 | Broden |
| 7,231,827 | B2 | | 6/2007 | Kumpfmüller |
| 7,284,437 | B2 | | 10/2007 | Krippner et al. |
| 2002/0115397 | A1 | * | 8/2002 | Kajiwara et al. ............ 451/398 |
| 2002/0153426 | A1 | * | 10/2002 | Yano et al. ................ 236/92 B |
| 2007/0289386 | A1 | * | 12/2007 | Burczyk et al. ............... 73/717 |

\* cited by examiner

*Primary Examiner*—Andre J Allen
(74) *Attorney, Agent, or Firm*—Cesari and McKenna, LLP (57) ABSTRACT

A pressure transducer for a pressure sensor (2) for determining at least one pressure ($p_a$, $p_b$) in a process media (3a, 3b) has a housing (4) with a separating diaphragm (5a, 5b), at least one first pressure-sensing element (6a, 6b), a contact media (7a, 7b), at least one first connection element (8a, 8b) and at least one first seal (9a, 9b). The separating diaphragm (5a, 5b) separates the process media (3a, 3b) from the contact media (7a, 7b), the contact media (7a, 7b) conveys the pressure ($p_a$, $p_b$) of the process media (3a, 3b) determined by the separating diaphragm (5a, 5b) to the first pressure-sensing element (6a, 6b). The first seal (9a, 9b) houses the first connection element (8a, 8b) and the housing (4), the separating diaphragm (5a, 5b) and the first seal (9a, 9b) form a first pressure chamber (10a, 10b). A second pressure chamber (14) is provided on the side of the first pressure chamber (10a, 10b) opposite the first seal (9a, 9b) and a second pressure-sensing element (15) is arranged in the second pressure chamber (14).

12 Claims, 7 Drawing Sheets

PRESSURE TRANSDUCER AND METHOD FOR MONITORING THE STATE OF A PRESSURE TRANSDUCER AND PRESSURE SENSOR

BACKGROUND OF THE INVENTION

1. Field of the Invention

The invention relates to a pressure transducer for a pressure sensor for determining at least one pressure in a process media having a housing, a separating diaphragm, at least one first pressure-sensing element and at least a first seal, wherein the separating diaphragm separates the process media from the contact media, the contact media conveys the pressure of the process media determined by the separating diaphragm to the first pressure-sensing element, the first seal houses the first connection element and wherein the housing, the separating diaphragm and the first seal form a first pressure chamber. The invention relates further to a method for monitoring the state of such a pressure transducer as well as a pressure sensor that is provided with such a pressure transducer.

Pressure transducers of the type being discussed here have been known for a long time and are used to transform the pressure to be determined in a process media into a measuring signal that can be further processed, for example, is displayed or is used in the broadest sense in the scope of process control tasks.

2. Description of the Prior Art

The physical effects that are used basically for measuring a pressure in a process media or, respectively, in the first pressure chamber of the pressure transducer and to convert the pressure into a corresponding parameter are very different and are based either on mechanical or hydrostatic principles, but often on methods that show an electric effect that can be evaluated (e.g. elastic pressure-sensing probes, electrical measurement of distortion, capacitive measurement of deflection, deformation measurement using a strain gauge, inductive or capacitive distance measurement or piezo-electric, magnetoelastic or resistor pressure-sensing probes). The exact method for pressure conversion is not important in the scope of the invention described here. It is also of no significance, whether the pressure transducer is a transducer for absolute, reference or relative pressure measurement; all considerations shown here can be applied for all of the mentioned types of pressure transducers.

The embodiment described above of a pressure transducer of the sort being discussed here with a separating diaphragm that separates the process media found outside of the pressure transducer from the interior of the pressure transducer exists primarily for protecting the interior of the pressure transducer, in particular, however, the pressure-sensing element of the pressure transducer, from aggressive process media. For this reason, the separating diaphragm is generally made of a very non-corrosive material such as stainless steel, Hastelloy or Tantalum, wherein the separating diaphragm has to be very thin, for example in a range of 30 µm to 50 µm, so that conveying the pressure from the process media to the—mostly liquid—contact media in the first pressure chamber can occur without being influenced by the separating diaphragm, so that the dynamics of the pressure transducer are reduced as little as possible.

Depending on the range of application, pressure transducers can be exposed to high mechanical loads, for example through pressure impulses, temperature fluctuations and chemically aggressive process medium, so that the very thin, and thus mechanically sensitive separating diaphragm, can be damaged to the point that is becomes leaky and the process media can no longer be kept away from the interior of the pressure transducer. The intrusion of a chemically aggressive process media into the interior of the pressure transducer usually results in the destruction of the pressure transducer, which often leads to significant disturbances within the entire process, since the state variables supplied by the pressure transducer or, respectively, the pressure sensor in which the pressure transducer is applied, generally retroact on the process in the scope of controlling or regulation.

The consequences of a process media penetrating into the pressure transducer could, however, be much more serious, in particular when the process media is inflammable or explosive. In this case, there is a risk of the process media igniting on the first pressure-sensing element in the first pressure chamber, if it is connected to electrical potentials, which is the case for most pressure transducers. The greatest risk is that the flames from the process medium ignited on the first pressure-sensing element in the first pressure chamber extend beyond the first pressure chamber into the outer process pipelines, which can lead to an explosion of all areas of the supply and conveying process with process media. Such a spread of flames can be prevented with appropriate constructive measures in the area of the first pressure chamber; pressure transducers having such a "flame barrier" are known as "ex-d" explosion-proof.

However, further defects are known from experience that are not protected by the above-mentioned safety mechanism. A documented, dangerous defect exists in that the first seal of the first pressure chamber becomes leaky, so that the contact media can leak out of the first pressure chamber and, in the case of additional damage to the separating diaphragm, an inflammable process media can penetrate through the first seal, unobstructed by the first pressure chamber into the area of the pressure transducer on the other side of the first seal, opposite the first pressure chamber. On this side of the first seal, opposite the first pressure chamber, there is normally an electric circuit—belonging to the pressure sensor—, so that there is a greater chance here of the process media being ignited. The inflammable process media has enough space here to be ignited in such amounts that the safety mechanism described above no longer guarantees protection against a breakthrough of the explosion in the area of the first pressure chamber. In particular, feedthroughs in the first seal in which connection elements are fed that allow for e.g. an electrical connection of the first pressure-sensing element from outside of the first pressure chamber, are weak points that lead to leaking.

SUMMARY OF THE INVENTION

It is, thus, a main object of the invention to avoid—at least partially—the described disadvantages in the known pressure transducers, in particular to allow detection of a flaw in the area of the first seal.

The described object is met first and essentially with the pressure transducer being discussed here in that a second pressure chamber is provided on the side of the first pressure chamber opposite the first seal and a second pressure-sensing element is arranged in the second pressure chamber. This constructive measure makes it possible that the space on the side of the first pressure chamber opposite the first seal, which has a particularly high risk of explosion, can also be monitored with regard to the pressure prevalent in the space. A leak in the first seal of the first pressure chamber will always—unexpectedly—cause a change in pressure within the second pressure chamber that can be detected by the second pressure-sensing element in the second pressure chamber.

In a particularly advantageous embodiment of the invention, the pressure transducer is designed so that the pressure in the second pressure chamber is essentially independent of the pressure in the first pressure chamber when the first seal is in a flawless sealing state. In this case, a leakiness of the first seal can, thus, be observed in that the second pressure-sensing element registers a pressure that shows a dependency on the pressure in the first pressure chamber or—in the simplest case—is simply just time-shiftable.

In another embodiment, the pressure transducer according to the invention is designed so that the pressure in the second pressure chamber is dependent on the pressure in the first pressure chamber when the first seal is in a flawless sealing state. The embodiment opens the possibilities for recognizing a leak in the first seal of the first pressure chamber when the pressure in the second pressure chamber measured by the second pressure-sensing element no longer responds in the anticipated manner to the pressure in the first pressure chamber measured by the first pressure-sensing element. The embodiment of the invention is based on the knowledge that the path for pressure transmission from the process media, to the first pressure chamber, to the first seal, to the second pressure chamber and up to the second pressure-sensing element is a path with particular—cushioning—transmission behavior. This transmission behavior is influenced by changes in the mechanical-geometrical conditions of the transmission elements involved—and thus by changes in the soundness of the first seal, which separates the first pressure chamber from the second pressure chamber. Changes in the soundness of the first seal are, by all means, observable in that the pressure in the second pressure chamber measured by the second pressure-sensing element is either faster or slower or more or less cushioned than the pressure in the first pressure chamber measured by the first pressure-sensing element.

In a further embodiment of the invention, the second pressure chamber has a second seal, wherein the second seal houses at least a second connection element and the second pressure-sensing element and/or—indirectly—the first pressure-sensing element is contacted via the second connection element, in particular from outside of the second pressure chamber.

When it is said that the first pressure chamber has a first seal and the second pressure chamber has a second seal, it doesn't mean that these seals have to be designed separately from the housing, rather they could be designed in the housing or, respectively in a housing wall, so that the housing closes soundly with the first connection element or, respectively the second connection element.

Connection elements are, for example, electrical circuit points for contacting the first pressure-sensing element or, respectively the second pressure-sensing element. However, they could be connecting points for conduit tubes in the case of a differential pressure sensor or a filler neck for filling the first pressure chamber with the contact media. Nevertheless, the first seal and the second seal can also be made such that they are distinctly separate, wherein the first seal and the second seal are preferably made of ceramics or glass, preferably using sintering. Depending on the source material, such seals are highly resistant, also against aggressive process media.

The object described above is also met with a method for monitoring the state of the pressure transducer according to the invention, wherein the pressure transducer comprises a housing, a separating diaphragm, at least a first pressure-sensing element, a contact media, at least a first connection element and at least a first seal, wherein the separating diaphragm separates the process media from the contact media, the contact media transmits the pressure of the process media conveyed via the separating diaphragm to the first pressure-sensing element, the first seal houses the first connection element, wherein the housing, the separating diaphragm and the first seal form a first pressure chamber and wherein a second pressure chamber is provided on the side of the first pressure chamber opposite the first seal and a second pressure-sensing element is arranged in the second pressure chamber. Applied on such a pressure transducer, the method according to the invention provides foremost and essentially that the pressure value determined by the second pressure-sensing element in the second pressure chamber is compared with a given pressure value and a deviation signal is set off when the pressure value determined for the second pressure chamber exceeds a given or, respectively, predetermined deviation from the given pressure value.

The method according to the invention takes advantage of the fact that the possibility first exists to measure the pressure on the side of the seal opposite the first pressure chamber in the second pressure chamber by the second pressure-sensing element and, thus, to compare the pressure or, respectively, the pressure progression in the second pressure chamber and a given pressure value.

In a particularly preferred embodiment of the method according to the invention, not only does a deviation signal go off, but the pressure transducer or, respectively, the first pressure-sensing element and/or the second pressure-sensing element of the pressure transducer are or will be switched either electrically potential-free or at a definite electrical potential. This measure prevents that a process media penetrating into the first pressure chamber and/or the second pressure chamber ignites due to electric discharge of the first pressure-sensing element and/or the second pressure-sensing element and/or further electrical circuit parts located outside of the first pressure chamber and outside of the second pressure chamber.

When the pressure transducer is designed in such a manner that the pressure in the second pressure chamber is essentially independent of the pressure in the first pressure chamber when the first seal is free of defects and in a sealed state, then, in a preferred embodiment of the method, an essentially constant pressure value is chosen as a given pressure value, in particular a value that encompasses "normal"—e.g. pre-set—conditions. The tolerated deviation from the given pressure value is preferably not a zero deviation, but rather a deviation from the given pressure value that lies within a range of tolerance around this given pressure value. The range of tolerance is, in particular, measured so that pressure fluctuations in the second pressure chamber caused solely by temperature differences do not lead to setting off a deviation signal.

However, when the pressure transducer is designed so that the pressure in the second pressure chamber has a certain dependency on the pressure in the first pressure chamber when the first seal is free of defects and in a sealed state, then the method in question is preferably designed so that the given or presettable pressure value is the pressure determined by the first pressure-sensing element in the first pressure chamber. Thus, it is maintained that pressure transmission behavior of the second seal is constantly being monitored for pressure transmission from the first pressure chamber to the second pressure chamber by comparing the pressure in the second pressure chamber with the pressure in the first pressure chamber and, in this manner, leaks are detected between the first pressure chamber and the second pressure chamber.

In particular in the last-mentioned method, it has been proven to be advantageous when, in evaluating the deviation of the pressure value determined by the second pressure-sensing element in the second pressure chamber from a given pressure value, the dynamic changes of the pressure value determined in the second pressure chamber and/or the given pressure value are taken into consideration. This means that knowledge is used of dynamic transfer behavior of a pressure signal from the first pressure chamber in the second pressure chamber. Here, it is particularly wise to take into consideration temporal reduction of the pressure values and/or down time between the pressure values to be compared.

Finally, the object described above is met with a pressure sensor that includes a pressure transducer of the type described above and additionally has an electronic evaluator, which is connected in terms of a signal with the pressure transducer or, respectively, with the first pressure-sensing element and/or the second pressure-sensing element so that the measured pressure value can be processed by the evaluator. The evaluator is designed thereby so that execution of a method for monitoring the state of the pressure transducer described above is possible.

A particularly simple constructive implementation of the pressure sensor is possible when the electronic evaluator is at least partially provided in the second pressure chamber. In principle, this allows that the evaluation of the signals coming from the first pressure-sensing element and the second pressure-sensing element can already be carried out in the second pressure chamber and the signal transmission that inevitably goes hand in hand with the first pressure-sensing element and the second pressure-sensing element no longer have to be lead through the second pressure chamber. Preferably, the second pressure-sensing element is incorporated by the evaluator, in particular in that the second pressure-sensing element is provided on a printed circuit board of the evaluator or, respectively on a printed circuit board of a first part thereof.

In detail, there are multiple possibilities for designing and further developing the pressure transducer according to the invention, the method for monitoring the state of the pressure transducer according to the invention and the pressure sensor. In this matter, please refer, on the one hand, to the dependent claims and, on the other hand, to the following description of preferred embodiments in connection with the drawing.

DESCRIPTION OF THE PREFERRED EMBODIMENTS

In FIGS. 1 to 7, a pressure transducer 1 is shown in connection with a complete pressure sensor which happens to be a combined absolute and difference pressure sensor. The pressure transducer 1 serves the purpose of determining at least one pressure $p_a$, $p_b$ in a process media 3a, 3b. The pressure transducer 1 has a housing 4 with a separating diaphragm 5a, 5b, a first pressure-sensing element 6a, 6b, a contact media 7a, 7b, multiple connection elements 8a, 8b and a first seal 9a, 9b. Since the described pressure transducer 1—by all means, also—is a matter of a difference pressure transducer, practically all of the structures coupled with measurement exist twice, which, however, does not change the fact that the described and shown pressure transducer 1 as well as the described and shown pressure sensor 2 and the method described using the figures can be realized just as easily as with a simple (absolute) pressure sensor.

The separating diaphragm 5a, 5b at hand is of Hallstoy and separates the process media 3a, 3b from the contact media 7a, 7b, wherein the contact media 7a, 7b, on the one hand, should allow for a preferably uncushioned transmission of the pressure $p_a$, $p_b$ in the process media 3a, 3b to the first pressure-sensing element 6a, 6b and, on the other hand, acts as a barrier between a possible aggressive or explosive process media 3a, 3b and the first pressure-sensing element 6a, 6b.

It can be seen in FIGS. 1 to 5 that the housing 4, the separating diaphragm 5a, 5b and the first seal 9a, 9b form a first pressure chamber 10a, 10b, wherein the contact media 7a, 7b completely fills the first pressure chamber 10a, 10b.

The first seal 9a, 9b houses the first connection element 8a, 8b, wherein, in FIGS. 1 to 4, the first connection element 8a and the first connecting element 8b each include multiple connection elements, namely conduit tubes 11 that transmit the pressure from the first pressure chamber 10a, 10b to the first pressure-sensing element 6a for the purpose of measuring a difference in pressure, a filling piece 12 that is used to fill the first pressure chamber 10a, 10b with the contact media 7a, 7b and electric cables 13 that conduct electrical potential to and from the first connection elements 8a, 8b.

Figure 1:
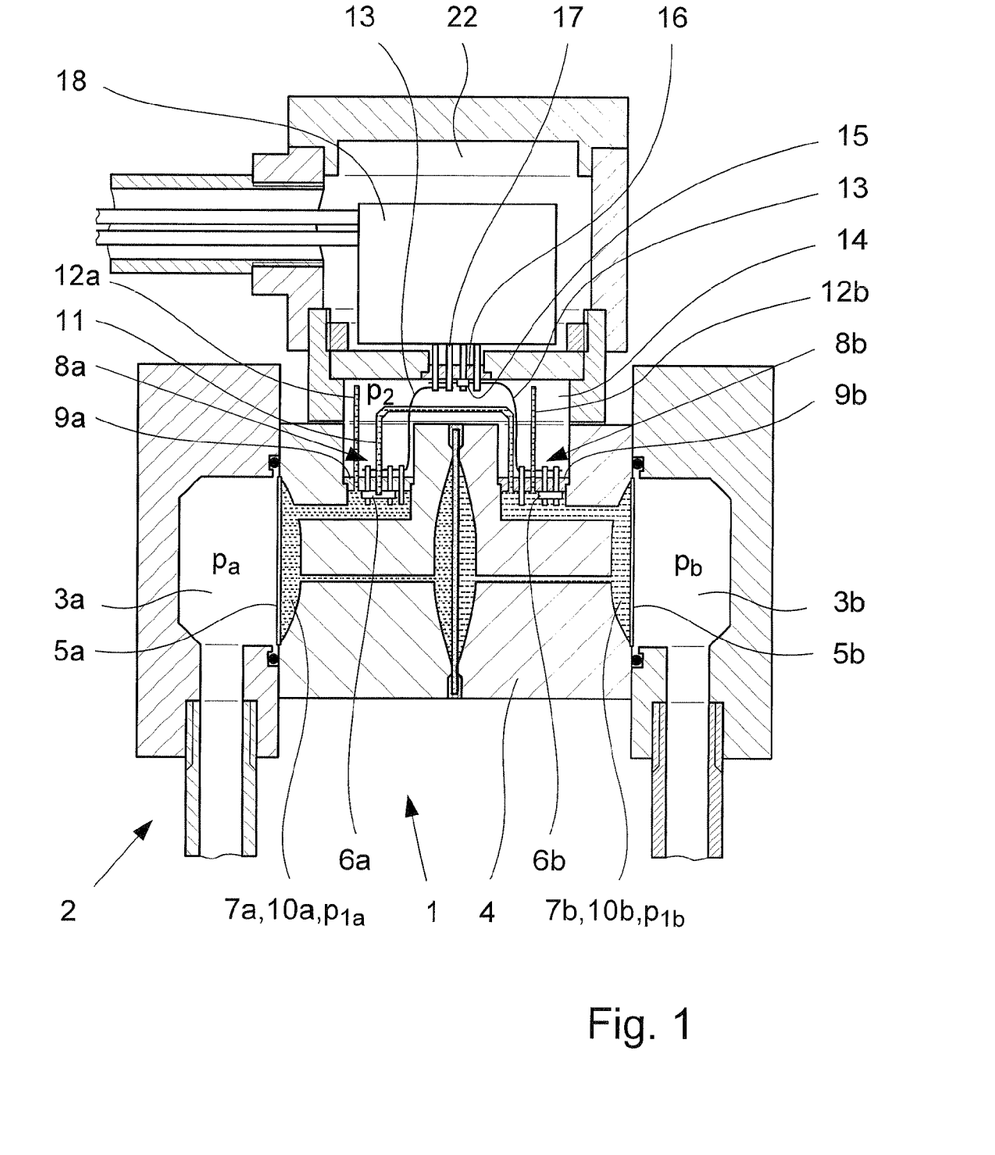
FIG. 1 is a pressure sensor with a pressure transducer in a sealed state.
Figure 4:
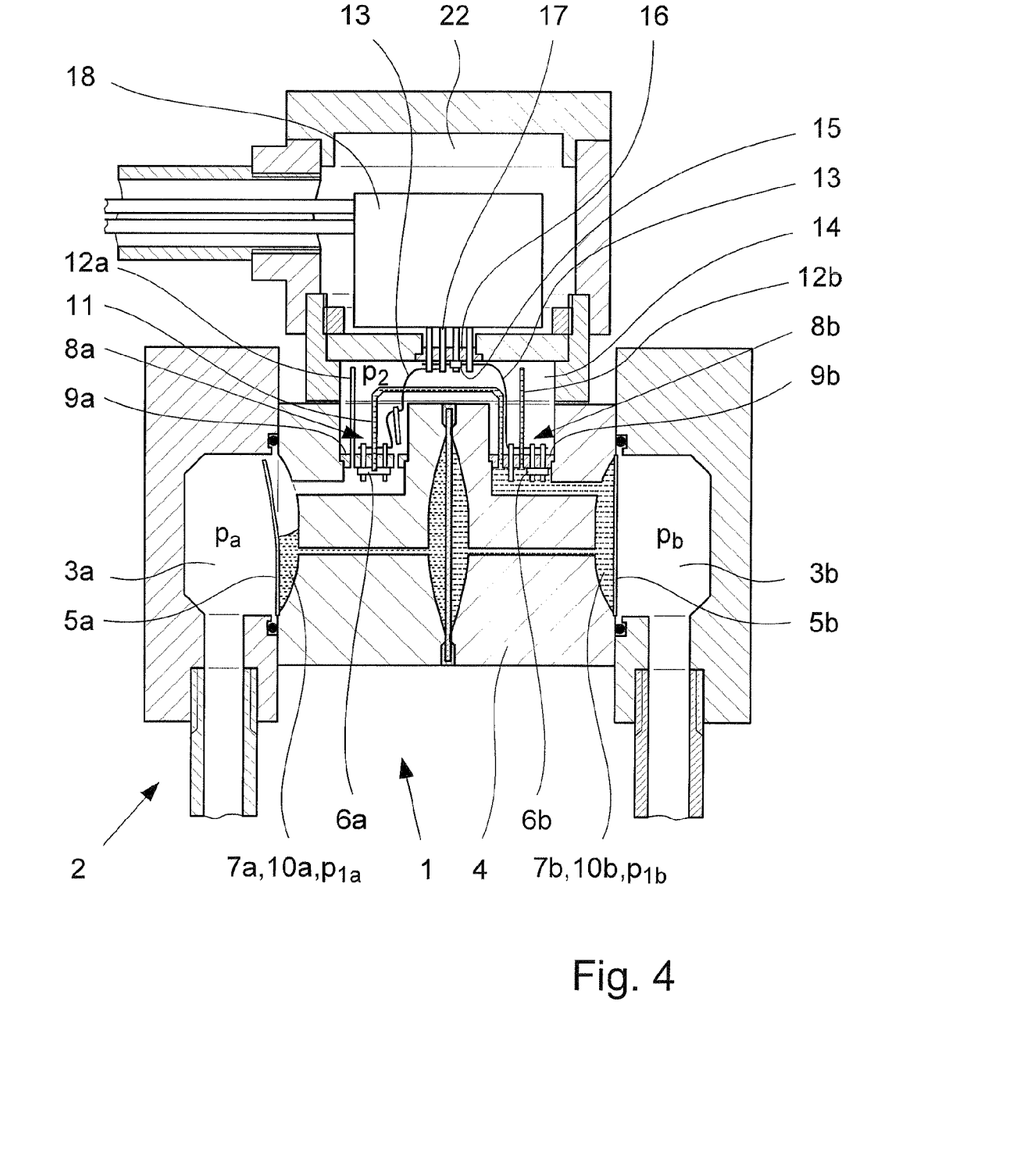
FIG. 4 is a pressure sensor with a pressure transducer, in which the separating diaphragm and the first seal in the first pressure chamber are defective.

A sound pressure transducer 1 is shown in FIG. 1, which has a faultless separating diaphragm 5a, 5b and faultless first seal 9a, 9b and, thus, has a closed first pressure chamber 10a, 10b. The malfunction situation shown in FIG. 4 is particularly dangerous, in which not only the separating diaphragm 5a, 5b, but also the first seal 9a, 9b are defective so that the contact media 7a, 7b no longer forms a barrier between the process media 3a, 3b and the space on the side of the first pressure chamber 10a, 10b opposite the first seal 9a, 9b so that—known from the prior art, not shown here—there is a risk for pressure transducers that an inflammable process media ignites on the electrical circuits and the electrical connections of the first pressure-sensing element 6a, 6b.

In order to avoid this, the pressure transducer 1 shown in FIGS. 1 to 4 is designed so that a second pressure chamber 14 is provided on the side of the first pressure chamber opposite the first seal 9a, 9b and, a second pressure-sensing element 15 is arranged in the second pressure chamber 14. Due to these measures, process media having gone through the first seal 9a, 9b does not immediately come into contact with the electrical circuit parts of the higher pressure sensor 2, but rather arrives, firstly, in the second pressure chamber 14, wherein the second pressure-sensing element 15 provided there generally opens up the possibility of recognizing the described malfunction based on the changed pressure circumstances in the second pressure chamber 14.

In the pressure transducers 1 shown in FIGS. 1 to 4, the pressure $p_2$ in the second pressure chamber 14 has a certain dependency on the pressure $p_1$ in the first pressure chamber 10a, 10b, when the first seal 9a, 9b is in a faultless, sealed state. Furthermore, the second pressure chamber 14 respectively has a second seal 16, wherein the second seal 16 houses at least one second connection element 17 and the second pressure-sensing element 15 and—indirectly—the first pressure-sensing element 6a, 6b is contacted via the second connection element 17.

In other embodiments—not shown here—the pressure $p_2$ in the second pressure chamber 14 is essentially independent of the pressure $p_{1a}$, $p_{1b}$ in the first pressure chamber 10a, 10b, when the first seal 9a, 9b is in a faultless, sealed state, which is realized by a particularly good separation of the first pressure chamber 10a, 10b from the second pressure chamber 14. In the embodiments shown in FIGS. 1 to 4, not only the first seal 9a, 9b, but also the second seal 16 are made of glass material, which has very good characteristics in regard to corrosion resistance.

In the pressure transducers 1 or, respectively the pressure sensors 2 shown in FIGS. 1 to 4, a method is realized for monitoring the state of the pressure transducer 1 in which the pressure value $p_2$ determined by the second pressure-sensing element 15 in the second pressure chamber 14 is compared to a given pressure value and if a given deviation from the given pressure value is exceeded by the pressure value $p_2$ determined for the second pressure chamber 14, a deviation signal is set off. It is first possible by the second pressure-sensing element 15 in the second pressure chamber 14 to determine a defect in the transmission between the first pressure chamber 10a, 10b and the second pressure chamber 14 with an unexpected change in pressure.

In the shown pressure transducers, not only is a deviation signal set off as a reaction to an unacceptable deviation between the pressure value $p_2$ determined by the second pressure-sensing element 15 in the second pressure chamber 14 and the given pressure value, but the pressure transducer 1 is also electrically switched potential-free, so that a process media 3a, 3b (see FIG. 4) penetrating into the pressure transducer 1 can no longer ignite on different electrical potentials.

Since all embodiments shown deal with such a pressure transducer 1 in which, in a faultless, sealed state of the first seal 9a, 9b, the pressure $p_2$ in the second pressure chamber 14 has a certain dependency on the pressure $p_{1a}$, $p_{1b}$ in the first pressure chamber 10a, 10b, it is provided here that the given pressure value is essentially the same as the pressure $p_{1a}$, $p_{1b}$ in the first pressure chamber 10a, 10b determined by the first pressure-sensing element 6a, 6b.

Figure 2:
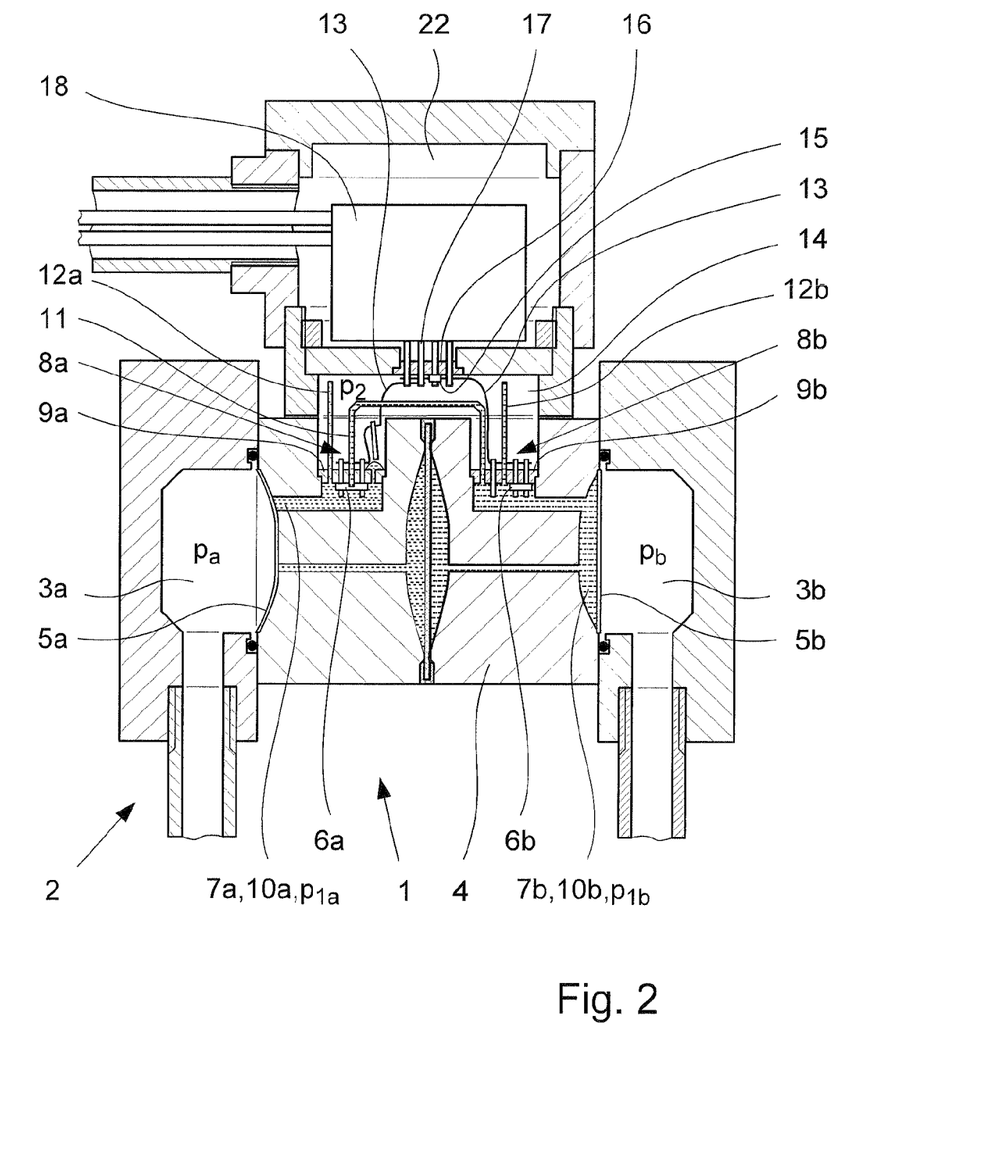
FIG. 2 is a pressure sensor with a defective pressure transducer, in which the first seal in the first pressure chamber is leaky.
Figure 3:
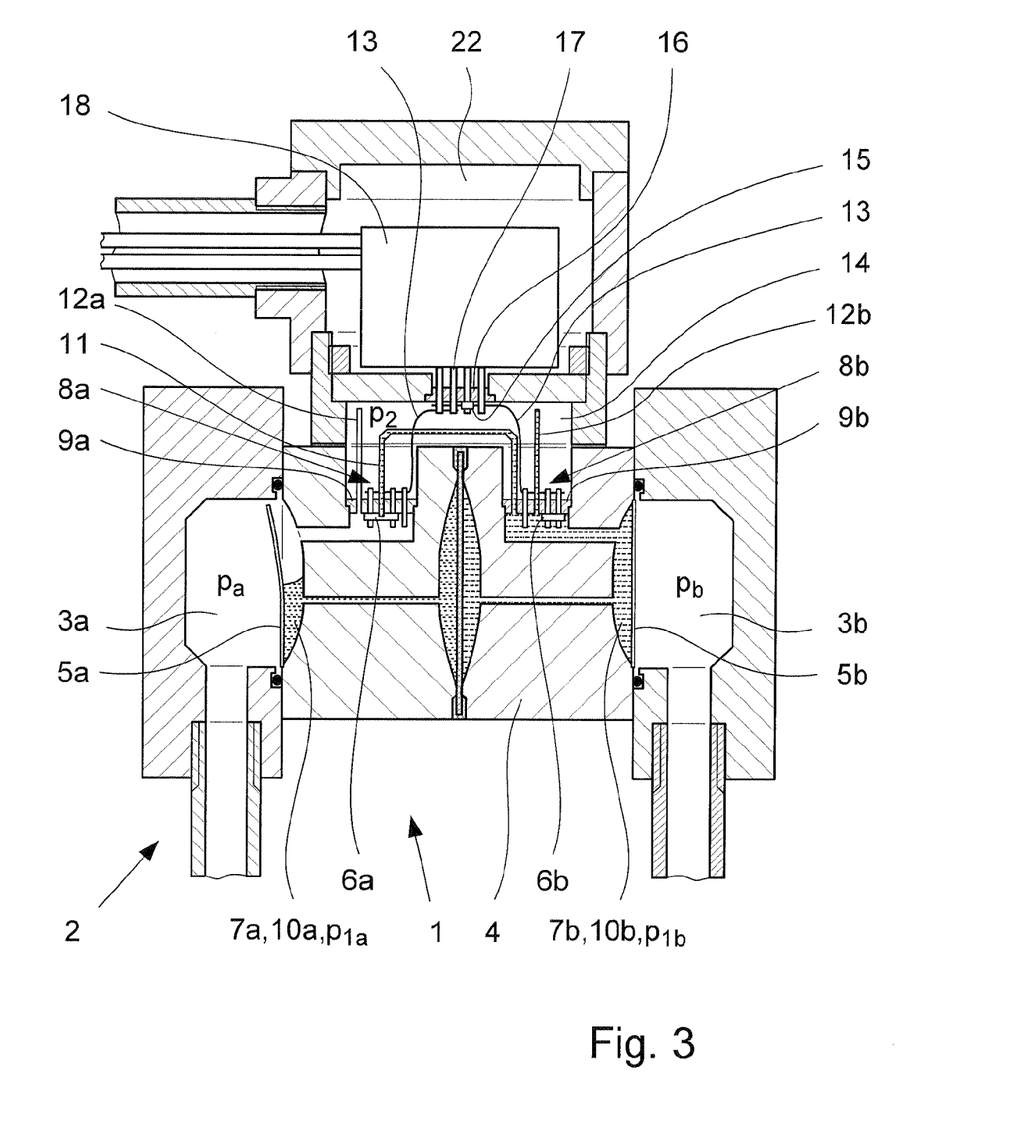
FIG. 3 is a pressure sensor with a pressure transducer, in which the separating diaphragm is defective.

It is shown in FIG. 2 that the first seal 9a, 9b has a leak, through which the contact media 7a can penetrate into the second pressure chamber 14. The first seal 9a shown in FIG. 2 has a different pressure transmission behavior as the sound seal 9a in FIG. 1, so that a difference results in the situations shown in FIGS. 1 and 2 when the pressure value $p_2$ determined by the second pressure-sensing element 15 in the second pressure chamber 14 is compared with the pressure measured by the first pressure-sensing element 6a in the first pressure chamber 10a, from which the error shown in FIG. 2 can be identified. The same goes for the error shown in FIG. 4, in which the separating diaphragm 5a is additionally defective.

As a result of the above, complete pressure sensors 2 are shown is FIGS. 1 to 4 each having a described pressure transducer 1 and additionally having an electronic evaluator 18 that is connected in terms of a signal to the pressure transducer 1 or, respectively, to the first pressure-sensing element 6a, 6b and/or the second pressure-sensing element 15. The evaluator 18 is designed in all embodiments so that the above-described method for monitoring the state of the pressure transducer 1 can be carried out with it.

In FIGS. 1 to 4, the evaluator 18 is always designed as a single piece and arranged in a separate chamber 22, wherein the separate chamber 22 is sealed off pressure-tight from the second pressure chamber 14. The electric cables 13 coming from the first pressure-sensing element 6a, 6b and the second pressure-sensing element 15 have to be lead separately through the second seal 16 so that the signals that they convey can be evaluated by the evaluator 18.

Figure 5:
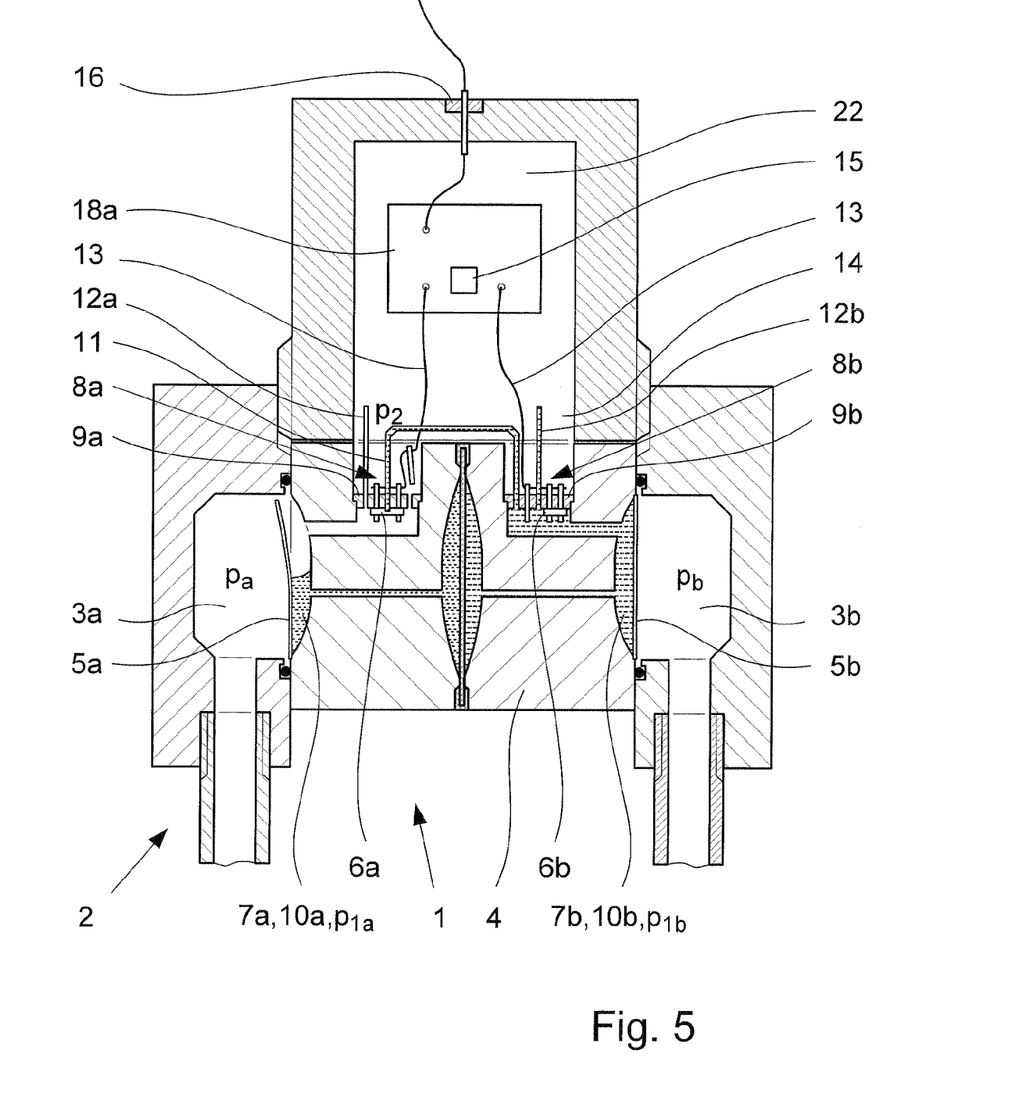
FIG. 5 is a pressure sensor according to FIG. 1 having an evaluator arranged in the second pressure chamber.

In FIG. 5, a variant embodiment of a pressure sensor 2 is shown in which the electronic evaluator 18 is partially provided in the second pressure chamber 14, wherein the second pressure-sensing element 15 is incorporated by the evaluator 18 or, respectively by a first part 18a of the evaluator 18, namely is provided on a printed circuit board 18a of the evaluator. The advantage of placing the evaluator 18 or, respectively a first part 18a of the evaluator in the second pressure chamber 15 is, among other things, that the second seal 16 does not need to be designed as elaborately since only the electric signals need to be lead through it that are necessary for data exchange between the first part 18a of the evaluator 18 and the second part 18b of the evaluator. Production of a pressure sensor 2 having an evaluator 18 arranged at least partially in the second pressure chamber 14 can be relatively easily realized.

Figure 6:
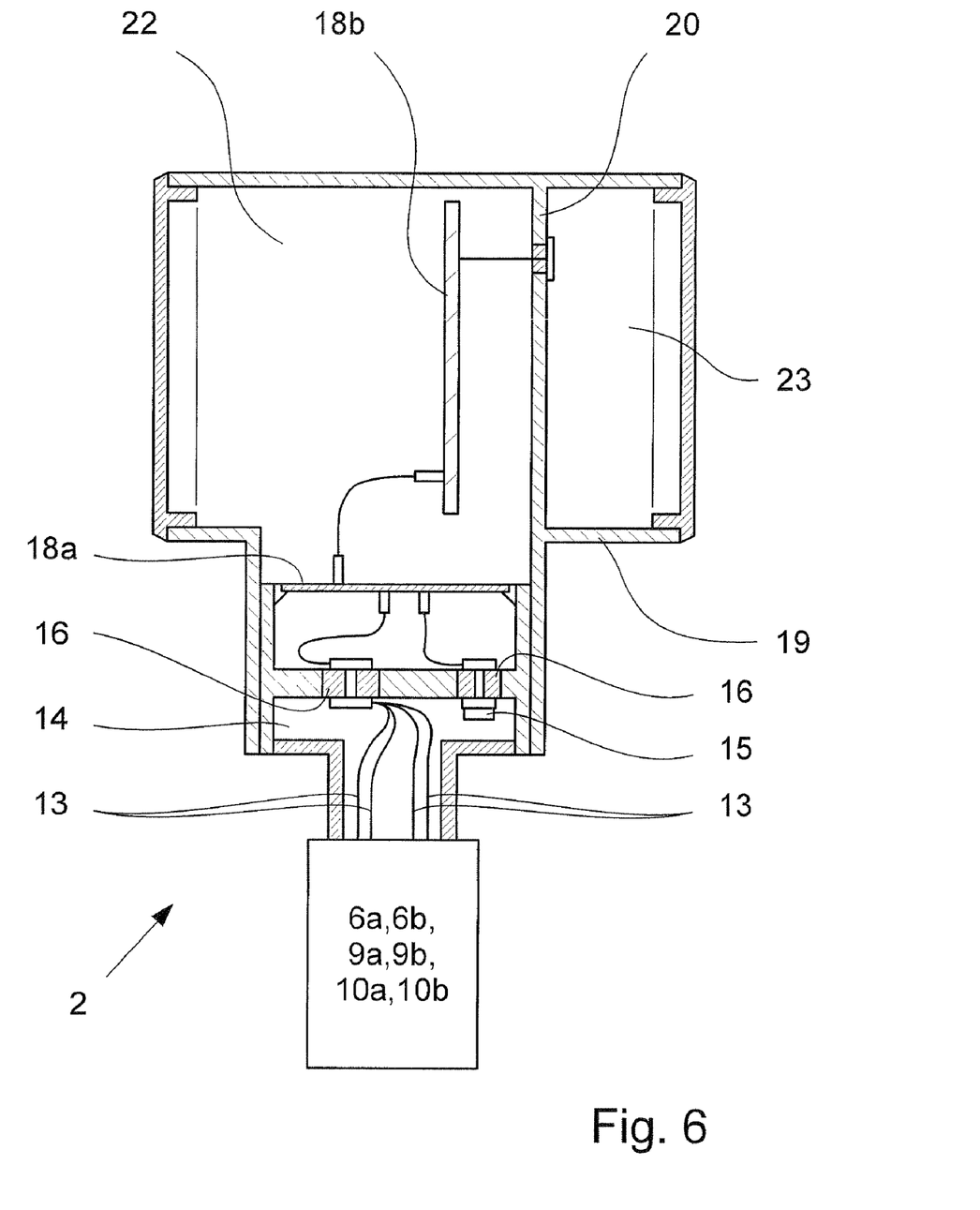
FIG. 6 is a further variation of a pressure sensor having an evaluator outside of the second pressure chamber.
Figure 7:
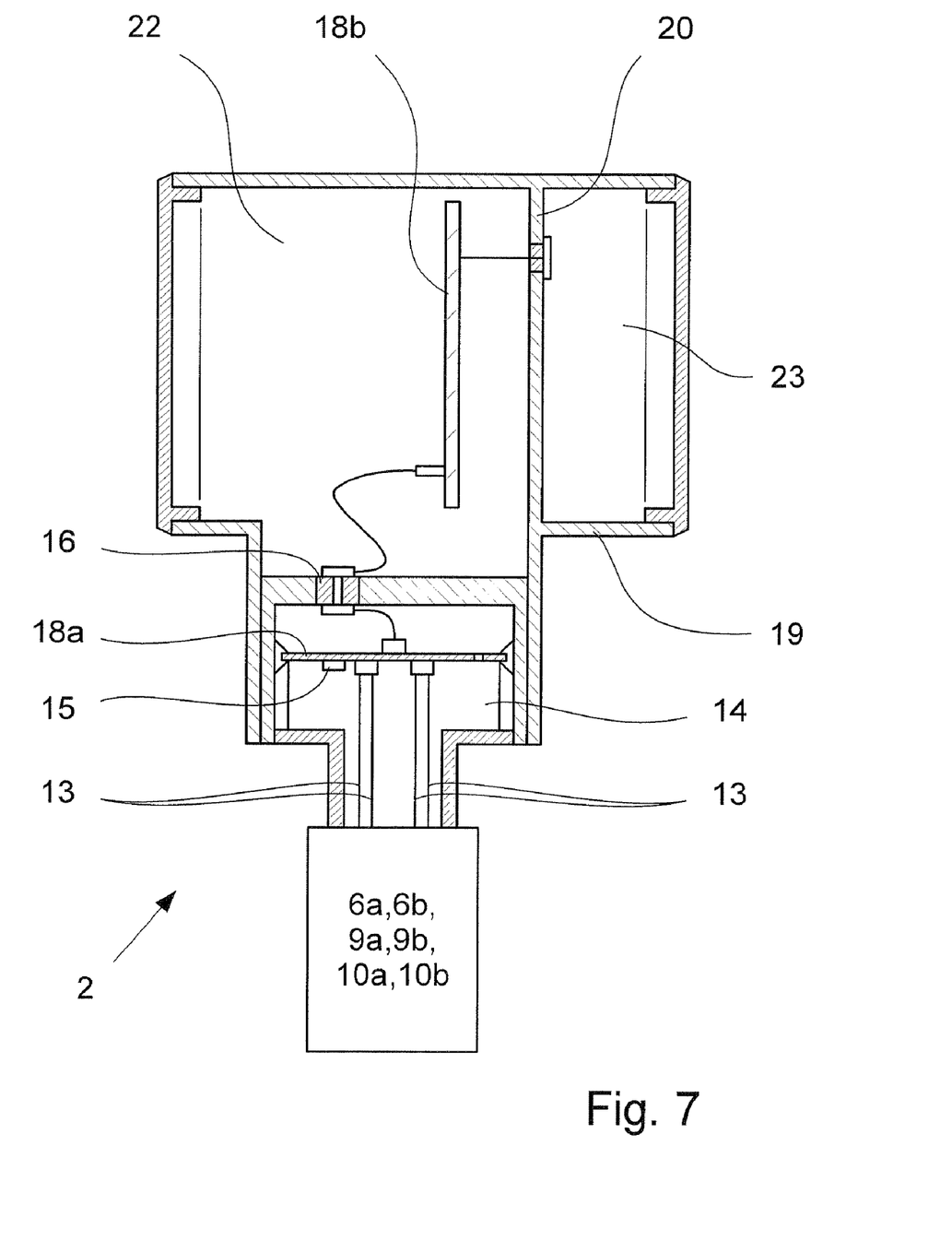
FIG. 7 is a further variation of a pressure sensor having an evaluator arranged partially in the second pressure chamber.

FIGS. 6 and 7 show a further embodiment of a pressure sensor 2 that differs from the pressure sensors 2 according to FIGS. 1 to 5. In FIGS. 6 and 7—as opposed to FIGS. 1 to 5—the first pressure-sensing element 6a, 6b, the first seal 9a, 9b and the first pressure chamber 10a, 10b are only shown as a block and it is only indicated that the electric cables 13 enter into the second pressure chamber 14. The pressure sensor 2 according to FIG. 6 is fundamentally consistent with the pressure sensors 2 according to FIGS. 1 to 5 since the evaluator 18, consisting of the first part 18a and the second part 18b of the evaluator, is not—not even partially—arranged in the second pressure chamber 14. Here, once again, it is necessary to provide feedthroughs for the second pressure-sensing element 15 and the electric cables 13 of the first pressure-sensing element 6a, 6b, wherein all signal transmissions are ultimately associated with the first part 18a of the evaluator 18. The housing 19 surrounds the evaluator 18, wherein a divider 20 within the housing 19 separates the separate chamber 22 in which the evaluator 18 is—at least partially—situated from an adjoining space 23.

The pressure sensor 2 according to FIG. 7 corresponds to the pressure sensor 2 according to FIG. 5 in terms of configuration, in which the first part 18a of the evaluator 18 is arranged inside of the second pressure chamber 14. A constructive advantage of the second seal 16 that is simple to realize is self-explanatory using this pressure sensor 2, in particular also compared to the pressure sensor according to FIG. 6. Only one signal connection between the first part 18a of the evaluator 18 and the second part 18b of the evaluator 18 is lead through the second seal 16, wherein this should not be understood as limiting the second seal 16 to only one single cable. Moreover, there could be multiple cables that are necessary for transmitting data/signals provided by the first part 18a of the evaluator 18 to the second part 18b of the evaluator 18; this could be, for example, a serial signal connection.

What is claimed is:

1. A pressure transducer for a pressure sensor (2) for determining at least one pressure ($p_a$, $p_b$) in a process media (3a, 3b), said pressure transducer having a housing (4) with a separating diaphragm (5a, 5b), at least one first pressure-sensing element (6a, 6b), a contact media (7a, 7b), and at least one first connection element (8a, 8b), wherein the separating diaphragm (5a, 5b) separates the process media (3a, 3b) from the contact media (7a, 7b), the contact media (7a, 7b) conveys the pressure ($p_a$, $p_b$) of the process media (3a, 3b) determined by the separating diaphragm (5a, 5b) to the first pressure-sensing element (6a, 6b), and wherein at least one first seal (9a, 9b) is provided in housing (4) which houses the first connection element (8a, 8b) and wherein the housing (4), the separating diaphragm (5a, 5b) and said at least one first seal (9a, 9b) form a first pressure chamber (10a, 10b), and wherein a second pressure chamber (14) is provided on the side of the first pressure chamber (10a, 10b) opposite said at least one first seal (9a, 9b) and a second pressure-sensing element (15) is arranged in the second pressure chamber (14).

2. The pressure transducer according to claim 1, wherein the pressure ($p_2$) in the second pressure chamber (14) is essentially independent of the pressure ($p_{1a}$, $p_{1b}$) in the first pressure chamber (10a, 10b) when said at least one first seal (9a, 9b) is in a flawless, sealed state or the pressure ($p_2$) in the second pressure chamber (14) has a certain dependency on the pressure ($p_1$) in the first pressure chamber (10a, 10b) when said at least one first seal (9a, 9b) is in a flawless, sealed state.

3. The pressure transducer according to claim 1 or 2, wherein the second pressure chamber (14) has a second seal (16), and wherein in the second seal (16) is housed at least one second connection element (17) and the second pressure-sensing element (15) and/or, indirectly, the first pressure-sensing element (6a, 6b) is contacted via the second connection element (17).

4. The pressure transducer according to claim 1 or 2, wherein said at least one first seal (9a, 9b) and/or the second seal (16) is/are made of ceramic or glass material using sintering.

5. A method for monitoring the state of a pressure transducer comprising the steps of placing a pressure transducer according to claim 1 or 2 in a process media (3a, 3b) and, determining a pressure value ($p_2$) in the second pressure chamber (14) by comparing the second pressure-sensing element (15) in the second pressure chamber (14) with a given pressure value and setting off a deviation signal when the pressure value ($p_2$) exceeds a given or, respectively, predetermined deviation from the given pressure value.

6. The method according to claim 5, wherein the pressure transducer (1) or, respectively, the first pressure-sensing element (6a, 6b) and/or the second pressure-sensing element (16) of the pressure transducer (1) are or will be switched either electrically potential-free or at a definite electrical potential.

7. The method according to claim 5, wherein the given or presettable pressure value is an essentially constant pressure value when the pressure transducer (1) is designed so that, in a flawless, sealed state of said at least one first seal (9a, 9b), the pressure ($p_2$) in the second pressure chamber (14) is essentially independent of the pressure ($p_{1a}$, $p_{1b}$) in the first pressure chamber (10a, 10b).

8. The method according to claim 5, wherein the given or presettable pressure value is the pressure ($p_{1a}$, $p_{1b}$) determined by the first pressure sensing element (6a, 6b) in the first pressure chamber (10a, 10b) when the pressure transducer (1) is designed so that, in a flawless, sealed state of said at least one first seal (9a, 9b), the pressure ($p_2$) in the second pressure chamber (14) has a certain dependency on the pressure ($p_{1a}$, $p_{1b}$) in the first pressure chamber (10a, 10b).

9. The method according to claim 8, wherein in evaluating the deviation of the pressure value ($p_2$) determined by the second pressure-sensing element (15) in the second pressure chamber (14) from a given pressure value, the dynamic changes of the pressure value ($p_2$) determined in the second pressure chamber (14) and/or the given pressure value are taken into consideration, in particular temporal reduction of the pressure values and/or down time between the pressure values to be compared.

10. A pressure sensor comprising a pressure transducer for determining at least one pressure ($p_a$, $p_b$) in a process media (3a, 3b), said pressure transducer having a housing (4) with a separating diaphragm (5a, 5b), at least one first pressure-sensing element (6a, 6b), a contact media (7a, 7b), and at least one first connection element (8a, 8b), wherein the separating diaphragm (5a, 5b) separates the process media (3a, 3b) from the contact media (7a, 7b), the contact media (7a, 7b) conveys the pressure ($p_a$, $p_b$) of the process media (3a, 3b) determined by the separating diaphragm (5a, 5b) to the first pressure-sensing element (6a, 6b), and wherein said at least one first seal (9a, 9b) is provided in housing (4) and which houses the first connection element (8a, 8b) and wherein the housing (4), the separating diaphragm (5a, 5b) and said at least one first seal (9a, 9b) form a first pressure chamber (10a, 10b), wherein a second pressure chamber (14) is provided on the side of the first pressure chamber (10a, 10b) opposite said at least one first seal (9a, 9b) and a second pressure-sensing element (15) is arranged in the second pressure chamber (14), and an electronic evaluator (18, 18a, 18b) that is connected in terms of a signal with the pressure transducer (1) or, respectively, with the first pressure-sensing element (6a, 6b) and/or the second pressure-sensing element (15), wherein the evaluator (18, 18a, 18b) is designed so that execution of a method for monitoring the state of the pressure transducer (1) according to claim 5 is possible.

11. The pressure sensor according to claim 10, wherein the electronic evaluator (18, 18a, 18b) is at least partially provided in the second pressure chamber, and wherein the second pressure-sensing element (15) is incorporated, in particular, by the evaluator (18, 18a, 18b), on a printed circuit board of the evaluator (18, 18a, 18b).

12. The pressure sensor according to claim 11, wherein only one signal connection between a first part (18a) of the evaluator (18, 18a, 18b) and a second part 18b of the evaluator (18, 18a, 18b) extends through the second seal 16.

* * * * *